United States Patent [19]

Tengan

[11] 4,244,398
[45] Jan. 13, 1981

[54] CHECK VALVE ASSEMBLY HAVING VALVE OPENING PRIOR TO PASSING FLOW AND FLOW SHUT OFF PRIOR TO VALVE CLOSING

[75] Inventor: Alfred K. Tengan, Huntington Beach, Calif.

[73] Assignee: Moog Inc., East Aurora, N.Y.

[21] Appl. No.: 67,438

[22] Filed: Aug. 20, 1979

Related U.S. Application Data

[63] Continuation of Ser. No. 876,737, Feb. 10, 1978, abandoned.

[51] Int. Cl.³ .............................................. F16K 31/12
[52] U.S. Cl. .............................. 137/630.19; 137/508; 137/629; 137/614.11; 251/210
[58] Field of Search ............. 137/508, 516.27, 630.22, 137/629, , 630.19, 614.11; 251/210

[56] References Cited

U.S. PATENT DOCUMENTS

| | | | |
|---|---|---|---|
| 1,331,720 | 2/1920 | Paterson | 137/630.22 |
| 1,681,597 | 8/1928 | Sanford | 137/614.11 X |
| 3,589,398 | 6/1971 | Haach | 137/614.11 X |

FOREIGN PATENT DOCUMENTS 1356775  2/1964  France .

Primary Examiner—Harold W. Weakley
Attorney, Agent, or Firm—Sommer & Sommer

[57] ABSTRACT

A check valve assembly which when opening has a valve closure which is lifted from its seat before fluid flows past the unseated closure, and which when closing terminates flow in advance of the closure reengaging its seat.

10 Claims, 7 Drawing Figures

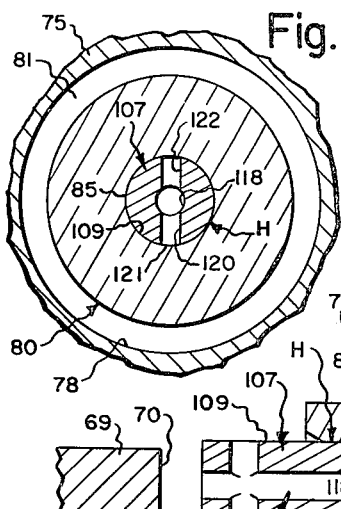
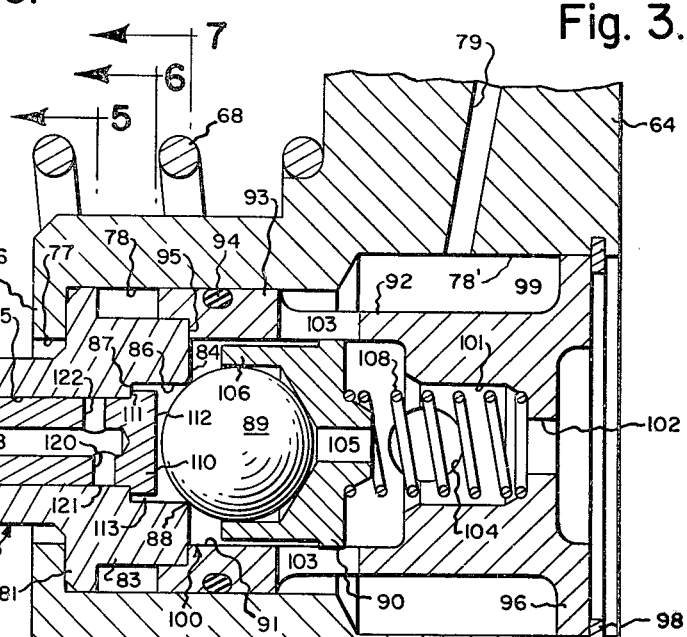
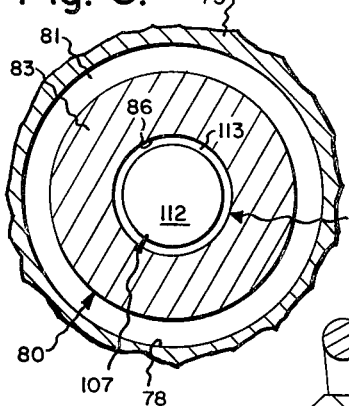
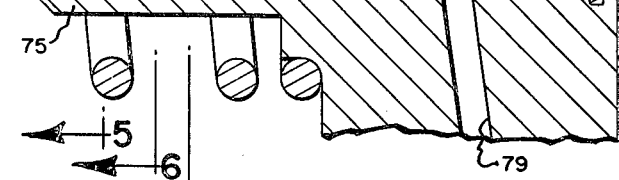
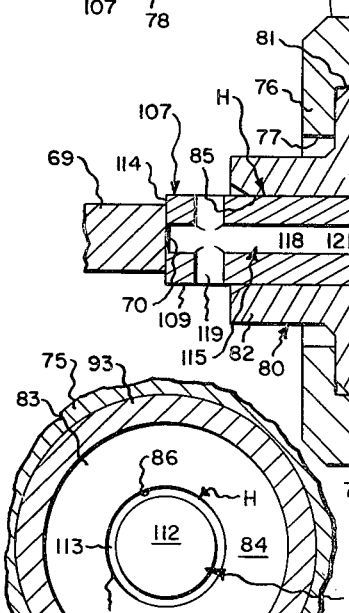
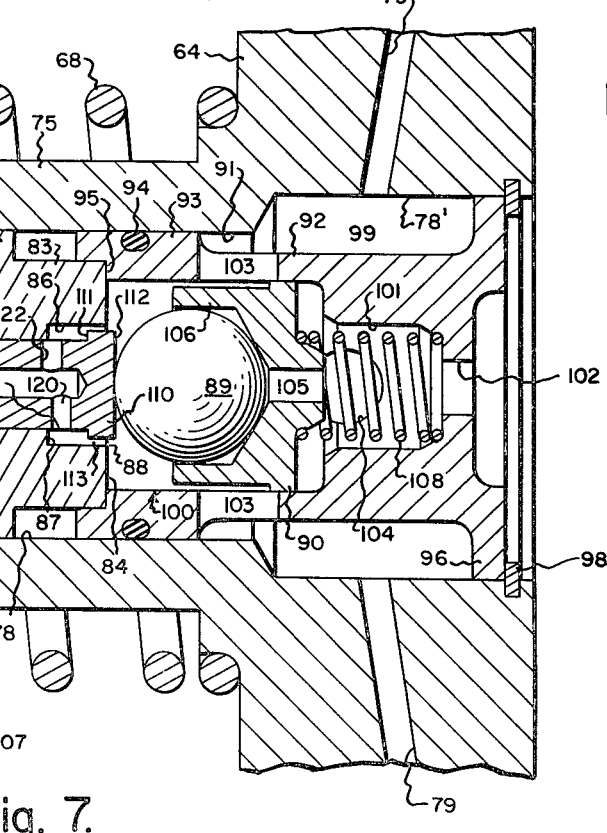

CLOSING SEQUENCE

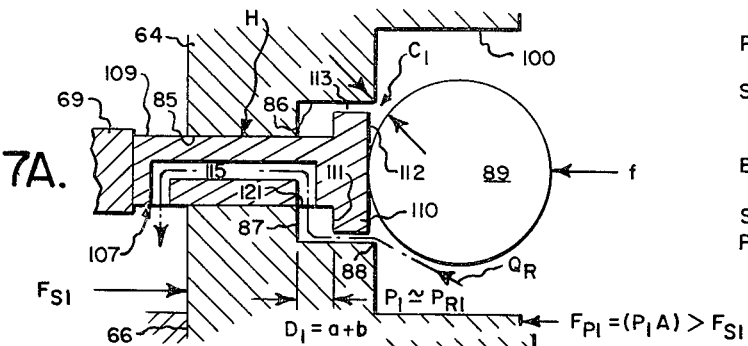

Fig. 7A.

PISTON AT LEFT RESTING ON CYLINDER STOP
SLIDE STATIONARY ON POST (FULLY DISPLACED TO RIGHT RELATIVE TO PISTON)
BALL FULLY UNSEATED (LIFTED BY SLIDE)
SERVO RETURN FLOWING
PORT FULLY OPEN

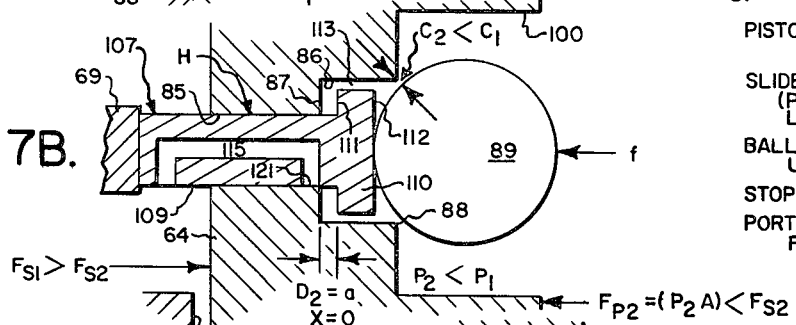

Fig. 7B.

PISTON LEAVES STOP, MOVING TO RIGHT
SLIDE ABOUT TO LEAVE POST (PARTIALLY DISPLACED TO LEFT RELATIVE TO PISTON)
BALL HELD PARTIALLY UNSEATED BY SLIDE
STOPPED SERVO RETURN FLOW
PORT JUST CLOSED (BYPASS FLOW JUST CUT OFF)

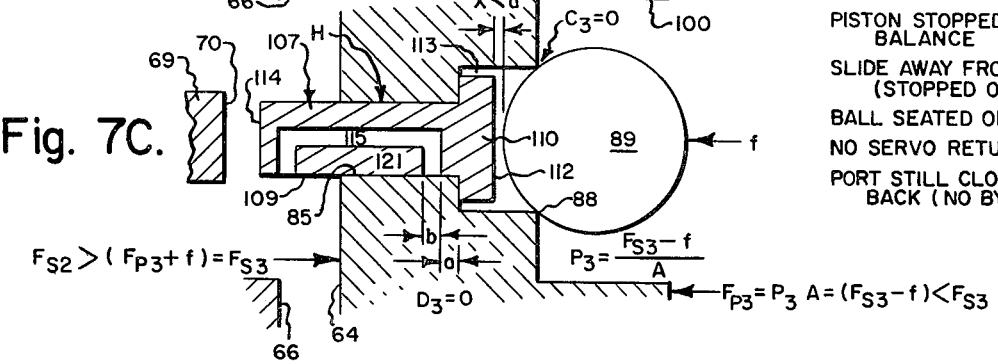

Fig. 7C.

PISTON STOPPED BY FORCE BALANCE
SLIDE AWAY FROM POST (STOPPED ON PISTON)
BALL SEATED ON PISTON
NO SERVO RETURN FLOW
PORT STILL CLOSED AT SETBACK (NO BYPASS FLOW)

LEGEND $A$ = AREA OF PISTON RIGHT FACE $a$ = SETBACK OF BYPASS PORT $b$ = LENGTH OF BYPASS PORT AXIALLY OF METERING PIN $C_1, C_2, C_3$ = RADIAL CLEARANCE BETWEEN BALL AND SEAT $D_1, D_2, D_3$ = DISPLACEMENT OF METERING PIN $f$ = LEFTWARD SPRING BIAS FORCE AGAINST BALL $F_{P1}, F_{P2}, F_{P3}$ = LEFTWARD PRESSURE-INDUCED FORCE AGAINST PISTON $F_{S1}, F_{S2}, F_{S3}$ = RIGHTWARD SPRING-INDUCED FORCE AGAINST PISTON $P_1, P_2, P_3$ = PRESSURE IN RIGHT PISTON END CHAMBER $Q_R$ = RETURN FLOW FROM SERVOVALVE $P_R$ = PRESSURE OF FLOW $Q_R$ UPSTREAM OF CHECK VALVE 61

$P_{R1}$ = PRESSURE OF FLOW $Q_R$ DOWNSTREAM OF CHECK VALVE 61

$X$ = SPACING BETWEEN METERING PIN HEAD AND BALL

CHECK VALVE ASSEMBLY HAVING VALVE OPENING PRIOR TO PASSING FLOW AND FLOW SHUT OFF PRIOR TO VALVE CLOSING

This is a continuation of pending application Ser. No. 876,737, filed Feb. 10, 1978 now abandoned.

FIELD OF INVENTION

This invention relates to the field of check valves, used alternately to allow the flow of fluid through a passage and to stop such flow, and more particularly to a check valve assembly which delays fluid flow when opening and delays closing following the termination of flow.

BACKGROUND OF THE INVENTION

Check valves generally are well known. Many hydraulic and pneumatic systems require check valves to achieve unidirectional fluid flow associated with one polarity of differential pressure across the check valve, and zero or negligible flow when the polarity of the differential pressure is reversed. Such check valve may be used to establish a priority of direction of fluid flow where the magnitude of the differential pressure across the check valve when flowing is small with respect to system operating pressures. Such check valve may also be used to relieve undesirably high pressure conditions. In these cases, the differential pressure across the check valve when flowing corresponds to the desired level of pressure relief.

A common objective of all check valves is to have zero or negligible flow, so-called leakage flow, when the check valve is supposedly fully shut off Conventional mechanizations of check valves include, ball and seat, poppet and seat, disc and nozzle tip, and diaphragm and nozzle tip.

In the operation of conventional check valves, when the differential force associated with opening the check valve, such as created by differential pressure or by other means, exceeds a bias force, usually created by a spring, the movable valve closure unseats or opens to pass fluid flow. The opening of the check valve, within limits of its operating travel, is generally proportional to the differential force. When the differential force is removed suddenly, the check valve closes rapidly and the valve closure seats positively. This mode of operation has given acceptably low leakage across the check valve.

A problem occurs during closing when the differential force across the check valve slowly decays to zero. The moving closure element of the check valve fails to seat positively and excessive leakage often occurs. This may be caused by the presence of micronic contaminant in the fluid that collects at the check valve seat when the moving closure element is almost bottomed or seated. This same silting phenomenon may occur if the differential force barely exceeds the magnitude of the bias force such that the valve fails to open fully prior to resealing. Another cause of the problem may be the presence of friction on the moving closure element that prevents it from finally seating. There may be other physical alignment problems which cause cocking or the like to prevent firm seating.

SUMMARY OF THE INVENTION

The present invention provides a construction of check valve assembly which overcomes the aforementioned disadvantage, obtained with prior art check valves, of very small valve opening before valve closing, or slow engagement of the valve closure element with its seat at the termination of higher values of fluid flow. This is achieved by providing a check valve having a two-stage valving action which includes a first stage between relatively slidable valving members, and a second stage between a valve closure movably arranged opposite a seat. The check valve operates, during opening, to unseat the second stage valve closure before the first stage valve slide opens to pass flow toward the unseated valve closure, and, during closing, operates to close the valve slide to shut off flow before the valve closure is fully seated, whereupon this valve closure during its final closing motion moves smartly against its seat, thus providing zero or negligible leakage flow when the check valve is fully closed.

Accordingly, the primary object of the present invention is to provide a check valve assembly which provides zero or negligible leakage flow when supposedly fully closed, especially during conditions of a differential force across the check valve slowly decaying to zero during closing.

Other objects are to provide such a check valve assembly which is reliable during repetitive operations and adaptable to many different applications where the presence of such a valve is desirable, which is simple in construction, employing relatively few parts which are easy to manufacture, and relatively inexpensive.

Still other objects and advantages of the invention will be apparent from the following detailed description of a preferred embodiment shown in the accompanying drawings.

BRIEF DESCRIPTION OF THE DRAWINGS

FIG. 3 is a fragmentary, greatly enlarged, longitudinal sectional view of the check valve assembly shown closed in FIG. 1.

FIG. 4 is a similar fragmentary, greatly enlarged, longitudinal sectional view of the check valve assembly shown open in FIG. 2.

FIG. 5 is a fragmentary, vertical, transverse sectional view thereof, taken on line 5—5 of FIG. 3, and showing the bypass metering port in the slide member when closed by the covering body, this valving action constituting the first stage of the check valve when closing.

FIG. 6 is a similar transverse view, taken on line 6—6 of FIG. 3, and showing an end view of the slide member as seen by the valve closure of the second stage.

FIG. 7 is a similar transverse view, taken generally on line 7—7 of FIG. 3, and showing the seat for the valve closure as seen thereby, with this closure removed, the valving action between this closure and seat constituting the second stage of the check valve when closing.

FIGS. 7A, 7B and 7C are schematic, longitudinal, central, sectional views through the inventive two-stage check valve, and depicting the closing sequence, beginning in FIG. 7A with both valve stages open corresponding to FIG. 7, then an intermediate condition in FIG. 7B showing the first stage just closed with the second stage still open, and finally ending in FIG. 7C showing both stages closed corresponding to FIG. 3.

Description of the Preferred Embodiment

Figure 1:
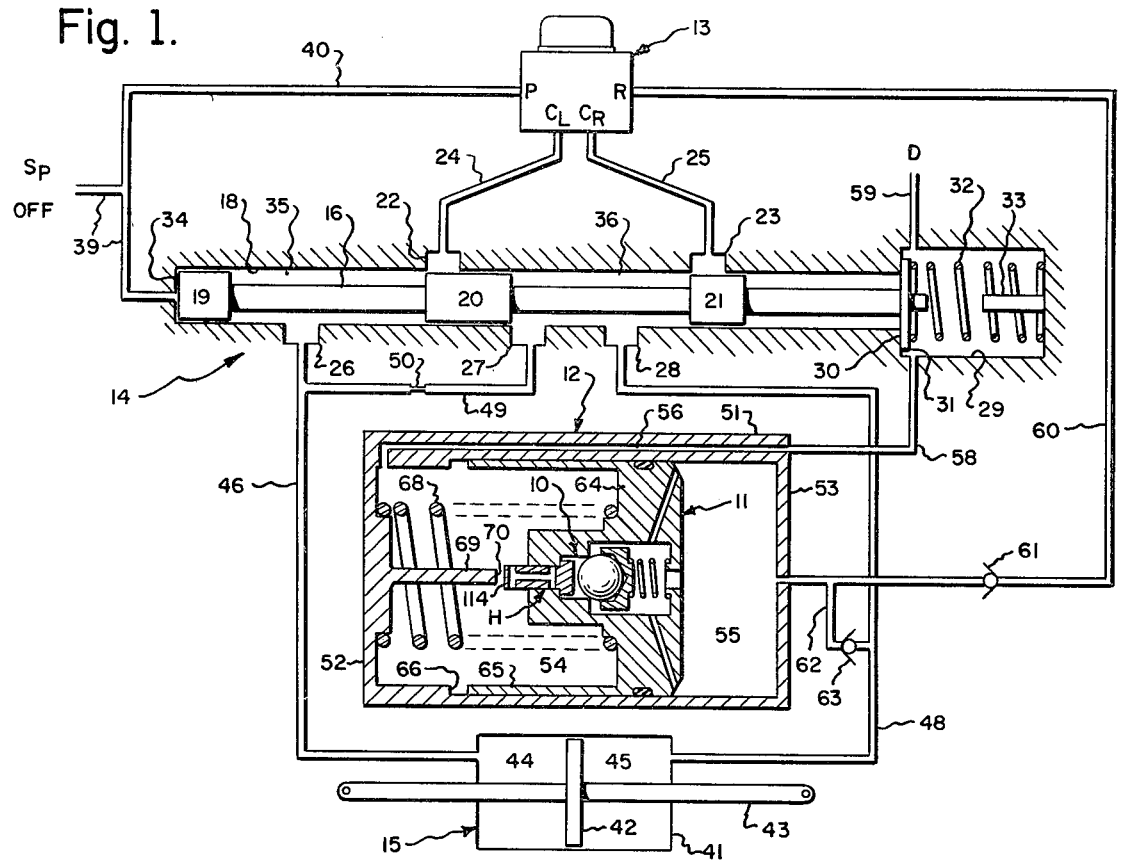
FIG. 1 is a longitudinal sectional view through a pressure compensator assembly embodying the check valve assembly of the present invention, and showing such compensator in association with other hydraulic apparatus, schematically represented, all to illustrate one practical application for the invention, the inventive check valve being in a fully closed condition.

The inventive two-stage check valve assembly 10 is shown as arranged in a floating piston 11 of a pressure compensator assembly 12. This compensator 12 is shown as part of hydraulic apparatus also including an electrohydraulic servovalve 13, a bypass valve assembly 14, and an actuator assembly 15.

The hydraulic apparatus illustrated is intended to be used with an on-off pressure supply $S_p$, which when "on" places actuator 15 under control of servovalve 13, but when "off" establishes a closed hydraulic circuit between opposite sides of the actuator piston. The compensator 10 is operatively associated with such closed hydraulic circuit to keep it filled with fluid so that there will be no cavitation therein.

While many uses may be found for such hydraulic apparatus, one is in connection with controlling the boom carried by a mother aircraft used during midflight refueling. Such boom is positioned by actuator 15 and normally travels retracted when a refueling operation is not taking place. That is when the pressure supply $S_p$ is "off". When $S_p$ is "turned-on", the boom can be lowered and flown during a refueling operation under control of electrical commands to servovalve 13. It will be appreciated that compensator 12 is expected to maintain the pressurized condition in the aforementioned closed hydraulic circuit for several hours of flight time.

Figure 2:
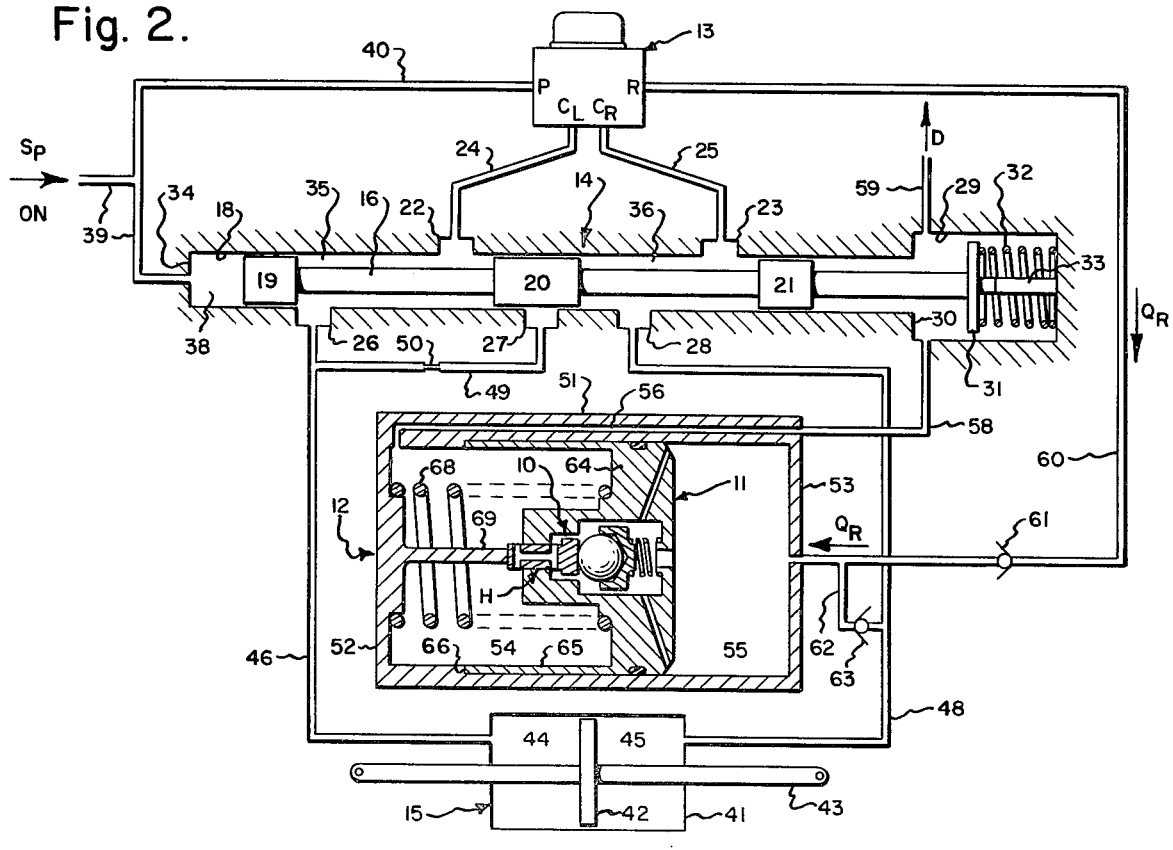
FIG. 2 is a view similar to FIG. 1 but showing the check valve in a fully open condition.

The condition of the hydraulic apparatus when $S_p$ is "off", with compensator 12 effective, is depicted in FIG. 1. The condition of the hydraulic apparatus when $S_p$ is "on", with compensator 12 ineffective, is depicted in FIG. 2.

More specifically, electrohydraulic servovalve 13 may be of any suitable type, such as the one disclosed in U.S. Pat. No. 3,023,782, the disclosure of which is incorporated herein by cross-reference thereto. Such a valve has a pressure port P, a return port R, and a pair of control ports, the left one shown being designated $C_L$ and the right one $C_R$.

Bypass valve assembly 14 is shown as including a valve spool 16 slidable in a cylinder 18. This valve spool has three lobes, 19, 20 and 21, from left to right, respectively. Cylinder 18 has two upper ports, the left one being designated 22 and the right one 23. A conduit 24 connects control port $C_L$ with left port 22, and a conduit 25 connects control port $C_R$ with right port 23. Cylinder 18 also has three lower ports 26, 27 and 28, from left to right, respectively.

The axial spacing between the left pair of lobes 19 and 20 is greater than that between the left pair of ports 26 and 27. The axial spacing between the right pair of lobes 20 and 21 is greater than that between the right pair of lower ports 27 and 28, but less than that between upper ports 22 and 23.

The right end of cylinder 18 is shown as enlarged at 29 to provide a rightwardly facing shoulder 30. Spool 16 at its right end carries a stop plate 31 adapted to engage shoulder 30, as shown in FIG. 1, and constantly urged theretoward by a spring 32. Rightward movement of spool 16 is limited by its engagement with a stop 33, as shown in FIG. 2.

Referring to FIG. 1, when stop plate 31 engages shoulder 30, left lobe is proximate the left end wall 34 of cylinder 16, center lobe 20 closes off left upper port 22, and right lobe 21 closes off right upper port 23. Also, in this position of the spool, left lower port 26 communicates with the annular space 35 between lobes 19 and 20, and center lower port 27 communicates with right lower port 28 through the annular space 36 between lobes 20 and 21.

Referring to FIG. 2, when spool 16 has rightwardly bottomed on stop 33, left lobe 19 is away from cylinder left end wall 34 to provide an end chamber 38 therebetween. Also, in this rightwardly displaced position of the spool, center lobe 20 has uncovered left upper port 22 but covered center lower port 27, and right lobe 21 has uncovered right upper port 23. This places ports 22 and 26 in communication through annular space 35, and ports 23 and 28 are placed in communication through annular space 36.

A pressure supply conduit 39 is shown as leading to end wall 34 to communicate with end chamber 38, and a branch conduit 40 connects conduit 39 with servovalve pressure port P.

Actuator assembly 15 is shown as having a cylinder 41 and a double acting piston 42 on a rod 43 which penetrates the cylinder end walls, to provide left and right end chambers 44, 45, respectively. Actuator left end chamber 44 communicates with left lower port 26 via a conduit 46. Actuator right end chamber 45 communicates with right lower port 28 via a conduit 48. A bypass conduit 49 having a damping orifice or restrictor 50 therein communicates center lower port 27 with actuator left conduit 46.

Pressure compensator assembly 12 includes a cylinder 51 having left and right end walls 52, 53, respectively, between which piston 11 is slidably arranged to provide left and right end chambers 54, 55, respectively. Left end chamber 54 communicates with one end of a passage 56 proximate left end wall 52. This passage extends horizontally through the upper wall of cylinder 51 and terminates in right end wall 53, where it is communicatively connected to a conduit 58 leading to the lower wall of cylinder 29. The upper wall of this cylinder 29 is connected to a conduit 59 which leads to drain D.

A conduit 60 at one end is communicatively connected to return port R of servovalve 13 and at its other end to compensator right end wall 53 to communicate this port with right end chamber 55. A suitable check valve 61 is arranged in conduit 60 and operative to pass fluid from right to left, but not in reverse. A branch conduit 62 having a suitable check valve 63 therein communicates conduit 60 between check valve 61 and chamber 55 with conduit 48, this check valve being operative to pass fluid from left to right from chamber 55 toward conduit 48 but inoperative to pass fluid in the opposite direction toward this chamber.

Compensator piston 11 is shown as having a cylindrical body 64 sealingly slidable on the wall of the bore of cylinder 51. An integral skirt 65 extends leftwardly from body 64 and the left end face of this skirt is adapted to engage an inwardly offset internal annular shoulder or stop 66 provided on the wall of cylinder 51 proximate the left end thereof. A helical compression spring 68 is shown arranged between left end wall 52 and the left end face of piston 11 to urge this piston constantly to the right. Left end wall 52 is shown as having a central horizontal post 69 projecting rightwardly toward piston 11 and terminating in a right end face 70. This post 69 is adapted to open check valve 10 in a manner explained later herein, when piston skirt 65 is in its leftmost position bottomed on stop 66, as shown in FIG. 2. When piston 11 is a more rightward position where skirt 65 is off stop 66, and check valve 10 has been moved out of engagement with post 69 in a manner also explained later herein, this check valve 10 is closed, all as depicted in FIG. 1.

Before describing the detailed construction of check valve 10, it is deemed desirable at this juncture to explain the general operation of the overall hydraulic apparatus.

It is first assumed that all parts of the apparatus are in the condition depicted in FIG. 1, which means the supply pressure $S_p$ is "off", bypass valve spool 16 is in its leftmost position, servovalve 13 is not operating, check valve 10 is disengaged from post 69 and closed, piston 11 is off its stop 66, and spring 68 is pressurizing a body of fluid trapped in right end chamber 55 and associated unblocked portions of conduits 60 and 62. In this position, bypass valve 14 is effective to establish communication between conduits 48 and 49 and to block the upper end of conduit 46. Thus, a closed hydraulic circuit is established between opposite sides of actuator piston 42, this circuit comprising left end chamber 44, conduit 46 up to where it is joined by bypass conduit 49, through restrictor 50 to port 27, annular space 36, port 28, conduit 48, and right end chamber 45.

Actuator piston 42 pumps fluid from one side to the other through damping orifice 50. This pumping action supplies passive damping for the flight control surface (not shown) suitably connected to piston rod 43 when actuator 15 is not being used to position such surface. It is necessary in this situation to keep the aforementioned closed hydraulic circuit filled with fluid so that there will be no cavitation that would otherwise interrupt the damping action. In this situation, compensator 12 provides a reservoir of pressurized fluid in end chamber 55 which can be effective, if the pressure in conduit 48 drops below that in chamber 55, to supply fluid to the closed circuit through conduit 62 by opening check valve 63. If the pressure in conduit 48 is above that in chamber 55, check valve 63 is closed. Since no fluid is flowing through servovalve 13, no pressure exists in conduit 60 up to check valve 61, which is maintained closed by the higher pressure to the left of this check valve supplied from end chamber 55. It will also be noted that compensator left end chamber 54 has an unobstructed communication with drain D through connected passage 56, conduit 58, enlarged cylinder portion 29, and conduit 59 leading to drain D.

It will be seen that when actuator 15 is "turned-off", compensator 12 functions to maintain a reservoir of fluid pressurized by the force of spring 68 against the imperforate transverse head of piston 11, available to keep the said closed hydraulic circuit filled. As leakage may occur over a period of time, say several hours, the pressurized fluid reservoir will automatically supply make-up fluid, thus maintaining the integrity of the passive damping action and avoiding cavitation which could otherwise destroy it.

It is now assumed that the time has come, after the previously assumed several hour standstill, to activate actuator 15 so as to intentionally move the flight control surface (not shown) associated with the actuator. The supply pressure $S_p$, which may be established in any suitable manner as by an electrically controlled pump (not shown), is "turned-on" and applied through conduit 39 to bypass valve left end chamber 38, and through conduit 40 to servovalve pressure port P. This causes bypass valve spool 16 to shift to the right against the urging of return spring 32 so as to block center lower port 27 and uncover upper ports 22 and 23, thereby placing servovalve left control port $C_L$ in communication with actuator left end chamber 44 via intermediate, now connected, conduits 24 and 46, open ports 22 and 26 and space 35, while at the same time placing servovalve right control port $C_R$ in communication with actuator right end chamber 45 via intermediate, now connected, conduits 25 and 48, open ports 23 and 28 and space 36. In this manner, the servovalve 13 can control flow with respect to actuator piston 42 in response to electrical input to the servovalve.

Assuming that there is no electrical input for the moment, there will still be a flow through the hydraulic amplifier of servovalve 13 which exits through return port R and flows through conduit 60 toward compensator right end chamber 55, this flow being represented by arrow $Q_R$ and having a pressure $P_R$. This servovalve return pressure $P_R$ is at a high enough level to open check valve 61 so as to pass fluid toward end chamber 55. A pressure drop will occur across check valve 61, dropping the pressure to $P_{R1}$ on the downstream side, which will be that pressure in end chamber 55. At this time the pressure in conduit 48 is higher than pressure $P_{R1}$ so as to keep check valve 63 closed.

Servovalve return fluid entering chamber 55 at pressure $P_{R1}$ is pressurized high enough to move piston 11 to the left against the urging of spring 68. This piston 11 will continue to move leftwadly until it bottoms on stop 66. Before the piston reaches this stop 66, check valve 10 will engage post 69 causing this valve to open and pass fluid from right chamber 55 to left chamber 54 from whence it flows to drain D through connected passage 56, conduit 58, chamber 29 and conduit 59. When right chamber 55 is so connected to drain, the pressure therein and applied to check valve 63 is insufficient to open this valve.

It will be seen that when actuator 15 is "turned-on" by reason of the supply pressure $S_p$ being "turned-on", compensator 12 is ineffective, i.e., non-functioning, so as to allow servovalve return fluid flowing in conduit 60 to pass through the now open passage of check valve 10 mounted on piston 11, and eventually flow to drain D.

With electrical input to servovalve 13, it will allow a responsive flow through conduits 24 and 25 to and from opposite sides of the actuator piston 42. The direction and magnitude of flow in conduits 24 and 25 will be proportionate to the direction and magnitude of the electrical current input to the servovalve. When flow is occurring in conduits 24 and 25, there will be flow in one of these conduits in a direction away from the servovalve derived from pressure port P, and flow in the opposite direction toward the servovalve in the other of these conduits which is exhausted from the servovalve through its return port R contributing to flow $Q_R$.

The specific construction illustrated for the inventive two-stage check valve assembly 10 will now be described. As best shown in FIGS. 3 and 4, the compensator piston body 64 has a central cylindrical tubular extension 75 which projects horizontally leftward from the left side of the piston and terminates in an inturned annular flange 76 leaving a central hole 77. The piston body 64 is provided with an enlarged bore portion 78' as a continuation of the bore 78 of tubular extension 75 and this counterbore opens to the right end face of the piston. Piston body 64 is shown as having a plurality of generally radial passages, severally indicated at 79, which extend from a beveled front outer corner to the counter bore 78'.

Arranged in bore 78 of tubular body extension 75 is a tubular seat member 80 having an intermediate outwardly extending annular flange 81 abutting body flange 76, a leftward central tubular extension 82 projecting through hole 77, and a rightward central tubular extension 83 terminating in a vertical end face 84. Member 80 is provided with a central horizontal through passage or hole H including a cylindrical left end bore portion 85 and an enlarged concentric cylindrical right end bore portion 86, leaving therebetween a rightwardly facing recessed annular shoulder 87. The outer cylindrical edge of counterbore 85 at its juncture with end face 84 provides a seat 88 for a valve closure 89 shown as a spherical ball. Ball 89 is shown as supported concentrically with respect to seat 88 for travel away and toward such seat, by a ball retainer member 90 slidably arranged in the left enlarged bore portion 91 of a tubular housing member 92. This member 92 is shown as having a slightly enlarged left end portion 93 closely fitting the surrounding wall of the bore of body extension 75 and sealed with respect thereto by an O-ring seal 94. The left end of this portion 92 is counterbored to provide a leftwardly facing annular shoulder 95 which abuts the outer marginal portion of end face 84. At its right end, housing member 92 has an enlarged head 96 which is arranged in piston body counterbore 78' and retained therein by a C-ring 98 disposed partly in an annular groove recessed in the wall of this counterbore and with its inner marginal portion abutting the right end face of this head. An annular space 99 is thus provided around the intermediate portion of housing member 92, and this space communicates with the inner ends of passages 79.

Housing member 92 has a horizontal bore 100 therethrough, including the enlarged left end portion 91, a reduced intermediate portion 101, and a still further reduced right end portion providing an opening 102 leading to the recessed central right end face of the housing member. A pair of diametrically opposed radial holes 103, 103 penetrate housing member 92 proximate its left enlarged portion 93, and another pair of diametrically opposed radial holes, one being shown at 104, penetrate this member proximate the junction between counterbore 91 and reduced bore portion 101. Both sets of holes 103 and 104 communicate annular space 99 with bore 100, as does also opening 102.

Ball retainer member 90 is shown as having a horizontal central through hole 105 and a plurality of leftwardly projecting fingers, severally indicated at 106, circumferentially spaced and embracing ball 89. These fingers extend beyond the center of ball 89 but short of its left salient face. The ball retainer 90 is slidable on the wall of housing bore 100, and at all times centers the ball 89 with respect to its seat 88. This retainer is constantly urged to the left by a helical compression biasing spring 108 which at its left end bears against this member and at its right end bears against a shoulder on housing member 92 formed by the offset between bore portion 101 and smaller opening 102.

Slidably arranged in passage H of seat member 82 and blocking this passage is a metering pin 107 having a cylindrical periphery 109 for most of its length and an enlarged concentric cylindrical head 110 at its right end. This head provides a leftwardly facing annular shoulder 111 adapted to abut shoulder 87 on the seat member. On its opposite side, the head has a right end face 112 adapted to abuttingly engage ball 89. The head 110 has a smaller diameter than that of bore 86 to provide an annular clearance 113 therebetween. At all times, the left end face 114 of pin 109 remains outside or to the left of the left end face of seat member extension 82.

A bypass channel, indicated generally by the numeral 115, is arranged in the shank portion of pin 107. As shown, this channel comprises a central horizontal portion 118 recessed from end face 114 and terminating at its right end short of right end face 112, a left transverse portion 119 intercepting central portion 118 and opening at opposite ends to pin peripheral surface 109, a radial branch 120 terminating at its outer end in a metering port 121 in pin surface 109, and a second radial branch 122 terminating at its outer end to an opening in this pin surface.

It is to be noted that the right edge of port 121 is set back from, i.e., spaced to the left of, pin shoulder 111. The outer opening of channel branch 122 is set back slightly more. At all times the outer openings of transverse channel branch 119 remain uncovered outside the left end face of seat member extension 82.

Relating FIGS. 3 and 4 to FIGS. 1 and 2, it will be seen that the bypass channel 115 is in constant communication with compensator piston left end chamber 54, and the right end chamber 55 is in constant communication with seat member right end face 84 via the connected bores, openings, holes, and spaces 79, and 99–105.

When check valve assembly 10 is closed, ball 89 engages seat 88 surrounding one end of passage H and closes it off at that end, and post end face 70 and metering pin end face 114 are separated, as depicted in FIGS. 1 and 3.

When piston 11 moves leftwardly from the fully closed check valve position shown in FIG. 1 toward the fully opened position shown in FIG. 2, pin end face 114 eventually engages post end face 70, causing the pin to stop. The piston body 64 continues to move leftwardly until limited by stop 66. This causes movement of pin 107 to the right relative to piston body 64, which operates first to close any space between head face 112 and ball 89, and then to push this ball off its seat 88 against the urging of spring 108. The initial unseating of the ball produces an annular orifice between the ball and its seat which communicates through clearance 113 with the chamber defined by that portion of counterbore 86 to the right of seat member shoulder 87. Bypass port 121 is kept covered by bore wall 85 until the leading or right edge of this port passes shoulder 87, at which point it begins to be uncovered. Such uncovering of this port opens the bypass channel 115 and allows fluid to flow therethrough from the right piston end chamber 55 to the left chamber 54. Such port uncovering continues until leftward movement of piston body 64 is terminated, with the port 121 being fully uncovered and branch passage 122 substantially fully opened. While the port is being uncovered, ball 89 is being pushed by the pin 107 farther away from its seat 88 so as to enlarge the aforementioned annular orifice.

The reseating movement of ball 89 onto its seat 88 is the reverse of the various movements of parts just described, and is achieved in such a way that the ball reengages its seat smartly at the end to minimize leakage flow between ball and seat.

The closing sequence is believed best understood by referring to the simplified structure illustrated in FIGS.

7A, 7B and 7C. The same numerals are used as in the previous figures to indicate like parts. Symbols are also used and a listing of the same appears as a legend below FIG. 7C.

FIG. 7A represents the fully opened condition of check valve assembly 10, and corresponds to FIG. 4. In this condition, the piston body 64 is stationary, engaging cylinder stop 66, being urged thereagainst by a leftward pressure-induced force $F_{p1}$ which is greater than an opposing rightward spring-induced force $F_{S1}$. Force $F_{P1}$ results from a pressure $P_1$ in reservoir chamber 55 acting across the area A of the right end face of piston 11, ignoring flow forces due to the check valve being open. A leftward spring bias force f holds ball 89 against pin face 112, and the pin 107 is thereby held against post 69 with end faces 70 and 114 engaging.

It will be noted that bypass port 121 is fully uncovered with pin shoulder 111 a distance $D_1$ away from body shoulder 87, and that a radial clearance $C_1$ exists between ball 89 and its seat 88. This clearance $C_1$ is of continuous circumferential extent to provide an annular orifice communicating bore 100 with pin head clearance 113, bore 86, port 121 and bypass channel 115, permitting flow through the check valve, suggested by the arrowed flow line $Q_R$, which is the same flow coming from servovalve return line 60 at a pressure $P_{R1}$. Thus $P_1$ is essentially equal to $P_{R1}$, derived from supply pressure $S_p$ when the latter is "turned-on" after pressure drops through the hydraulic system.

When supply pressure $S_p$ is "turned-off", servovalve return flow $Q_R$ ceases and pressure $P_R$, and hence pressure $P_{R1} = P_1$, begin to fall, reducing leftward force $F_{p1}$. When rightward force $F_{S1}$ overcomes decreasing force $F_{p1}$, piston body 64 begins to move to the right while pin 107 and ball 89 remain stationary, still engaged and resting on post 69. The effect is a retrogressive or leftward movement of pin 107 relative to piston body 64.

This retrogressive relative movement continues to progressively reduce the effective open area of metering port 121 until it is completely covered, as depicted in FIG. 7B. There, the right edge of port 121 is shown in line with body shoulder 87 and the spacing between shoulders 87 and 111 has been reduced by an amount b, equal to the length of port 121 in a direction axially of pin 107, so that this spacing is now $D_2$ which corresponds to the axial spacing between the right edge of port 121 and pin shoulder 111. This axial spacing is represented by a, the set back of the port from the pin shoulder. Thus, $D_2$ is equal to a, and less than $D_1$ by an amount b.

Progressively reducing the open area of port 121 until just closed produces a fluid metering effect, resulting from a slow decay to zero of the differential flow across the check valve.

Still referring to FIG. 7B, it will be noted that the radial clearance $C_2$ between ball 89 and its seat 88 has been reduced but not eliminated, even though fluid flow has been cut off by pin 107 and ceased through clearance $C_2$. In other words, the ball remains unseated. Since there is no fluid now flowing past the ball through clearance $C_2$, there is no ascreening or sieving of contaminant that may be in the fluid occurring at this reduced clearance to be trapped or built up on the valve seat. Also, the pressure $P_2$ in piston right end chamber 55 has fallen below the level of $P_1$ which existed in FIG. 7A. As the pressure in chamber 55 continues to fall, the rightward springinduced force $F_{S2}$ still dominates over the leftward pressureinduced force $F_{P2}$, and the piston body 64 will continue to move rightwardly.

The level of pressure $P_2$ is such that its application over piston area A is still ineffective to overcome rightward force $F_{32}$. The consequence is that the piston body continues to move rightwardly, causing pin 107 to separate from post 69. This allows the pressure on the right end of pin 107, applied through a still existing, although reducing, radial clearance between ball 89 and its seat 88, to push pin 107 to the left relative to piston body 64 so as to close the gap between shoulders 87 and 111. Once separation between post end face 70 and pin end face 114 occurs, the spring bias force f against ball 89 will also assist in closing this gap. The result is that the ball 89 moves quickly and smartly the final distance to its seat 88, reducing clearance $C_3$ to zero, as depicted in FIG. 7C.

While not necessary, a spacing X between pin face 112 and ball 89 is shown in FIG. 7C which depicts the fully seated position of this ball and the final position of pin 107. This spacing X must be less than port set back a, so that the pin will begin to lift the ball off its seat before port 121 begins to be uncovered to start bypass flow. Since shoulders 87 and 111 now engage, the spacing therebetween representative of pin displacement is zero. In this fully closed condition of the check valve assembly 10 depicted in FIG. 7C, which corresponds to FIG. 1, rightward compensator spring force $F_{S3}$ will be below previous force $F_{S2}$ due to further expansion of spring 68. The opposing or leftward forces comprise the pressure induced force $F_{P3}$ due to pressure $P_3$ acting over piston area A, plus spring bias force f. When these opposing forces equal each other, ignoring minor effects such as friction, the piston 11 is stationary with check valve 10 fully closed. Then pressure $P_3$ in end chamber 55 pressurizes the reservoir of fluid trapped in this chamber to make it available for use, as previously explained.

It will thus be seen that the check valve assembly 10, in closing to stop flow through passage H provides a first stage downstream valving and eventual blocking of this passage, achieved by body surface 85 closing port 121 in pin 107, followed by a second stage closing when ball 89 engages seat 88 surrounding the upstream end of this passage. In this manner, the closing of the upstream end of passage H is effected quickly, even though the preceding downstream closing has been very gradual.

From the foregoing, it will also be seen that the embodiment illustrated and described herein accomplishes the various stated objectives of the invention. The embodiment illustrated is the best mode contemplated at the time of filing this application for carrying out the invention. However, variations and modifications of the check valve structure, and the environments in which used, will readily occur to those skilled in the art without departing from the spirit of the invention.

For example, the body member hav ig passage H therethrough may be a stationary wall memb r instead of a movable piston as shown; the bypass channel may be provided in the body member instead of in the slide member so long as the metering port of such channel is arranged in one of the two relatively slidable surfaces forming an interface between such members; the second stage closure member may be other than a ball, such as a poppet, disc or diaphragm cooperable with a suitable seat surrounding the upstream end of the through passage; and the check valve may be opened other than mechanically engaging and displacing the first stage slide, as by a pressure differential across a wall provided with the passage H therethrough with which the check valve is associated.

The present invention is chiefly concerned with a solution for the problem, developed during closing, of minimizing leakage flow when the check valve is supposed to be fully closed, rather than concerned with valve opening which does not present this problem.

Accordingly, the invention is to be measured by the scope of the appended claims and not limited to the embodiment shown.

What is claimed is:

1. A two-stage valve assembly, comprising:
   a body member separating a pressurized chamber on one side thereof from a relatively unpressurized space on the other side thereof, said body member having an opening therethrough communicating said chamber and space and having a seat surrounding
   a valve element arranged in said chamber and biased to move toward said seat;
   a slide sealingly mounted in said opening for sliding movement relative to said body member, said slide having one surface arranged in said space and having another surface arranged to face said valve element;
   one of said slide and body member having a passageway therethrough, said passageway having one end communicating with one of said space and chamber and having its other end terminating in a port arranged to be selectively covered by the other of said slide and body member, said slide being movable toward said chamber to displace said element from said seat prior to said port being uncovered and to further displace said element from said seat when said port is uncovered; and
   an abutment member arranged in said space and adapted to selectively engage said slide one surface, one of said members being mounted for movement toward and away from the other.

2. A two-stage valve assembly as set forth in claim 1 wherein said slide other surface is arranged to selectively engage said valve element.

3. A two-stage valve assembly as set forth in claim 2 wherein said slide may move relative to said valve element when said valve element engages said seat.

4. A two-stage valve assembly as set forth in claim 1 wherein said passageway is provided in said slide.

5. A two-stage valve assembly as set forth in claim 4 wherein said passageway one end communicates with said space.

6. A two-stage valve assembly as set forth in claim 1, and further comprising opposing stop surfaces on said body member and slide to limit movement of said slide away from said valve element when said slide one surface is separated from said abutment member.

7. A two-stage valve assembly as set forth in claim 1 wherein one of said body and abutment members is biased to move away from the other.

8. A two-stage valve assembly as set forth in claim 1 wherein said body member is a piston slidably mounted in a cylinder, and wherein said abutment member is mounted on said cylinder.

9. A two-stage valve assembly as set forth in claim 8 wherein said piston is biased to move away from said abutment member.

10. A two-stage valve assembly as set forth in claim 8 and further comprising opposing stop surfaces on said piston and cylinder to limit movement of said piston toward said abutment member.

* * * * *